(12) United States Patent
Madhayyan et al.

(10) Patent No.: US 12,278,765 B2
(45) Date of Patent: Apr. 15, 2025

(54) CONGESTION MANAGEMENT IN CONTROLLERS

(71) Applicant: Cisco Technology, Inc., San Jose, CA (US)

(72) Inventors: Muthumayan Madhayyan, San Jose, CA (US); Ahmed Syed Basheeruddin, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 318 days.

(21) Appl. No.: 17/683,834

(22) Filed: Mar. 1, 2022

(65) Prior Publication Data

US 2023/0283557 A1    Sep. 7, 2023

(51) Int. Cl.
*H04L 47/12* (2022.01)
*G06F 15/173* (2006.01)

(52) U.S. Cl.
CPC ........ *H04L 47/12* (2013.01); *G06F 15/17331* (2013.01)

(58) Field of Classification Search
CPC . H04L 47/12; H04L 43/0829; H04L 43/0876; H04L 41/0213; H04L 43/10; G06F 15/17331
USPC ................................................ 370/229, 230
See application file for complete search history.

(56) References Cited

U.S. PATENT DOCUMENTS

| | | | |
|---|---|---|---|
| 11,074,015 B2* | 7/2021 | Kanno | G06F 3/0679 |
| 2007/0104095 A1 | 5/2007 | Kuhl et al. | |
| 2013/0343193 A1 | 12/2013 | Kwan et al. | |
| 2014/0185453 A1 | 7/2014 | Hwang et al. | |
| 2014/0281316 A1* | 9/2014 | Sano | G06F 11/1451 714/6.2 |
| 2015/0029853 A1 | 1/2015 | Raindel et al. | |
| 2015/0146527 A1 | 5/2015 | Kishore et al. | |
| 2019/0141157 A1 | 5/2019 | Lebsack et al. | |
| 2022/0217078 A1* | 7/2022 | Ford | H04L 47/11 |
| 2022/0217204 A1* | 7/2022 | Tatiparthi | G06F 3/067 |

OTHER PUBLICATIONS

Langlet, et al, "Direct Telemetry Access", Proceedings of the 2015 ACM Conference on Special Interest Group on Data Communication, Feb. 4, 2022, 16 pgs.
PCT Search Report and Written Opinion mailed Jun. 21, 2023 for PCT application No. PCT/US23/14225, 14 pgs.
Zhou, et al, "Flow Event Telemetry on Programmable Data Plane", SigComm, Aug. 10-14, 2020, 14 pgs.

* cited by examiner

*Primary Examiner* — Obaidul Huq
(74) *Attorney, Agent, or Firm* — Lee & Hayes, P.C.

(57) ABSTRACT

This disclosure describes techniques and mechanisms for managing congestion within a network with a controller. The techniques include identifying a first designated memory location from which a first destination device reads first data, identifying a second designated memory location from which a second destination device reads second data, writing the first data to the first designated memory location, incrementing, based at least in part on writing the first data, a write index; sending a first indication to the first destination device that the first data is ready to be consumed, determining that the first destination device retrieved the first data from the first designated memory location, and decrementing the write index.

21 Claims, 6 Drawing Sheets

CONGESTION MANAGEMENT IN CONTROLLERS

TECHNICAL FIELD

The present disclosure relates generally to the field of computer networking, and more particularly to managing congestion by a collector within a network, BACKGROUND Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

For instance, in Crosswork automation products, collectors may be used to retrieve data from network devices. In some examples, the collectors receive data from multiple network devices and deploy data to multiple destination devices. However, the controllers have a finite set of resources (e.g., CPU, memory, storage, etc.), such that buildup of memory occurs. Memory buildup may occur due to burstiness in traffic from various network devices (e.g., data sources), burstiness of consumption from various destination devices, differing rates of consumption by different destination devices, variability in the number of data sources and destination devices over time, among other reasons. Accordingly, as more devices are added to a network and as destination devices are slower to consume data from the collectors, the result is memory buildup, CPU contention, and instability within the network. For instance, memory buildup may result in loss of data (e.g., packets) for a destination device, thereby impacting the integrity of the information. Accordingly, there is a need for techniques and methods to optimize resource use of collectors within a network, while minimizing loss of collected data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
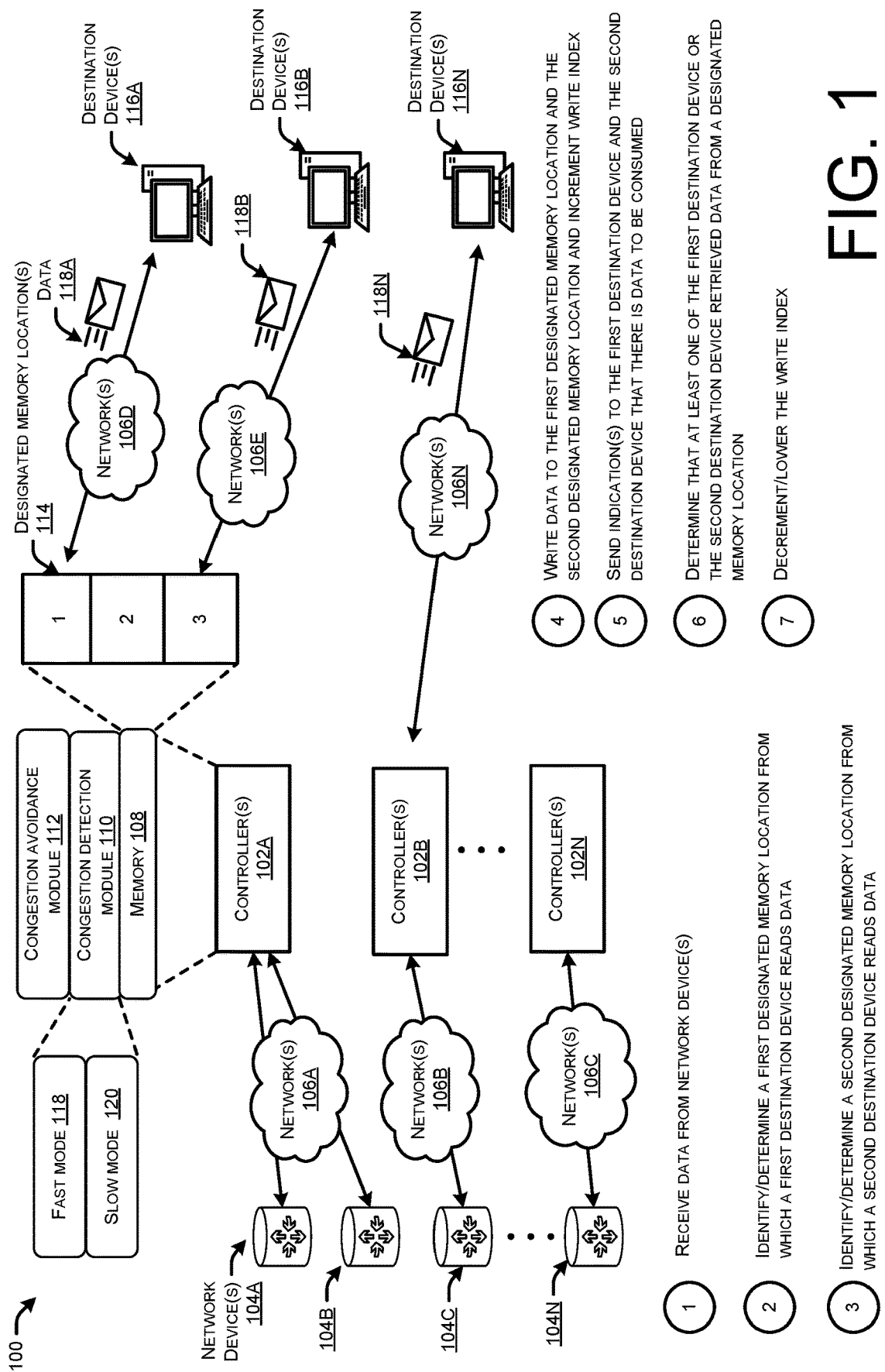
FIG. 1 illustrates a system-architecture diagram of an environment in which a controller can manage congestion in a network.

The present disclosure relates generally to the field of computer networking, and more particularly to a controller managing congestion within a network.

A method to perform techniques described herein may be implemented by a controller of a network and may include identifying a first designated memory location from which a first destination device reads first data. The method may further include identifying a second designated memory location from which a second destination device reads second data, writing the first data to the first designated memory location, incrementing, based at least in part on writing the first data, a write index, and sending a first indication to the first destination device that the first data is ready to be consumed. The method may also include determining that the first destination device retrieved the first data from the first designated memory location; and decrementing, based at least in part on the determining, the write index.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, Virtual Machines (VMs), core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

For instance, in Crosswork automation products, collectors may be used to retrieve data from network devices. In most examples, the collectors receive data from multiple network devices and deploy data to multiple destination devices. However, the controllers have a finite set of resources (e.g., CPU, memory, storage, etc.), such that buildup of memory occurs. Memory buildup may occur due to burstiness in traffic from various network devices (e.g., data sources), differing rates of consumption by different destination devices, variability in the number of data sources and destination devices over time, among other reasons. Accordingly, as more devices are added to a network and as destination devices are slower to consume data from the collectors, the result is memory buildup, CPU contention, and instability within the network. For instance, memory buildup may result in loss of data (e.g., packets) for a destination device, thereby impacting the integrity of the information. Accordingly, there is a need for techniques and methods to optimize resource use of collectors within a network, while minimizing loss of collected data.

This disclosure describes techniques and mechanisms for enabling a collector within a network to manage network congestion. In some examples, the controller may identify a first designated memory location from which a first destination device reads first data. In some examples, the controller may identify a second designated memory location from which a second destination device reads second data. In some examples, the controller may write the first data to the first designated memory location. The controller may increment, based at least in part on writing the first data, a write index and send a first indication to the first destination device that the first data is ready to be consumed. In some examples, the controller may determine that the first destination device retrieved the first data from the first designated memory location and decrement, based at least in part on the determining, the write index.

In some examples, the controller 102 may comprise memory. In some examples, the memory comprises storage, CPUs, etc. In some examples, the memory comprises one or more buffers (also referred to herein as "memory buffers") for storing data received from network devices. For instance, the buffers may comprise a ring buffer or any other suitable buffer.

In some examples, the controller 102 may comprise a polling collector (e.g., a collector that works on a request-response paradigm, such as SNMP, CLI, Netconf, or any other suitable collector), such that the controller controls the cadence at which network device(s) are polled for data. In some examples, the controller 102 may comprise a streaming collector (e.g., a collector that works on a register-listen paradigm, such as gNMI, MDT, Syslog, or any other suitable type of collector), such that the controller does not control when the network device(s) send data to the controller.

In some examples, the controller 102 may comprise a congestion detection module. In some examples, the congestion detection module detects congestion on the destination drains. For instance, the congestion detection module may determine that a threshold amount (e.g., 40%, 70%, 80%, or any suitable threshold) of the memory buffer of the controller has been filled with data. In response, the congestion detection module may cause the congestion avoidance module to implement a congestion avoidance technique. In some examples, the congestion detection module may declare and/or determine there is congestion according to one or more modes. For instance, the congestion detection module may determine there is congestion while the controller is operating in a slow mode In this example, the congestion detection module may determine there is congestion if more than a threshold amount of a memory buffer is full (e.g., such that there is not a sufficient cushion between a write index of the buffer and any of the read index(es) of the buffer. In other examples, the congestion detection module may determine there is congestion while the controller is operating in a fast mode. In this example, the congestion detection module may determine and/or declare congestion where the drain rate (e.g., how fast the destination device reads data from the memory location(s) of the controller 102, which may be based on throughput of the destination device) of all destination devices are determined to be slow.

In some examples, the controller may comprise a congestion avoidance module. In some examples, the congestion avoidance module may identify a congestion avoidance mechanism to enact. For instance, where the controller comprises a polling collector (e.g., a collector that works on a request-response paradigm, such as SNMP, CLI, Netconf, or any other suitable collector), such that the controller controls the cadence at which network device(s) are polled for data. In this example, when the congestion detection module declares congestion, the congestion avoidance module may determine to adjust a cadence at which the controller 102 receives data from the network device(s). For instance, where the controller polls the network device(s) 104 at a cadence of 30 seconds or greater, the congestion avoidance module may extend the polling cycle for a period of time (e.g., increase the cadence to be 35 seconds, 40 seconds, or any other suitable time period). In some examples, such as where the controller polls the network devices at a cadence of less than 30 seconds, the congestion avoidance module may determine to skip a polling cycle completely.

In other examples, the controller may comprise a streaming collector (e.g., a collector that works on a register-listen paradigm, such as gNMI, MDT, Syslog, or any other suitable type of collector), such that the controller does not control when the network device(s) send data to the controller. In this example, when the congestion detection module declares congestion, the congestion avoidance module may cause a throughput for the collector to be slowed down and/or temporarily suspended. For instance, the controller may host a TCP endpoint that receives streaming data from the network device(s). In this example, the congestion avoidance module may slow down the TCP throughput and/or temporarily suspends the TCP receive calls. As a result, the controller backpressures the network device(s). For instance, by temporarily suspending the TCP receive calls, the kernel buffers are backpressured, which results in the TCP window shrinking. Accordingly, all network device(s) that are sending data to the TCP endpoint hosted by the controller will automatically slow down their rate of transmission. In this example, once the congestion detection module determines that the buffer is less than a threshold amount full (e.g., such as 30%, 40%, or any other suitable threshold), the congestion avoidance module is notified and the congestion avoidance module may take the TCP receive call out of suspension, which lets the TCP window grow once again (e.g., increase streaming traffic again).

In this way, a controller can optimize resources, manage congestion within the network, and minimize the loss of collected data. That is the techniques described herein enable a controller to backpressure network devices well before a memory buffer is full, move slow destination devices along when the buffer is congested, drop write operations when the buffer is full, and ease backpressure when space in the buffer frees up. Moreover, all of the described operations are done as part of the write or read operations to the buffer ring. Accordingly, the controller is enabled to control a congestion avoidance scheme towards network devices and destination devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which a controller 102 manages network congestion. For instance, the controller 102 may comprise any network device (e.g., router, switch, etc.). In some examples, the controller 102 may comprise a standalone virtual machine (VM). In some examples, the controller 102 may comprise a Kafka client and/or a gRPC client. In some examples, the controller 102 may comprise multiple controllers and be included as part of a Crosswork Data Gateway (CDG). For instance, the CDG may comprise a finite set of resources (e.g., CPU, memory, storage) which is distributed amongst the multiple controllers. In some examples, the controllers 102 are used to perform a variety of functions, including but not limited to (i) receiving and/or retrieving telemetry data from network device(s) 104; (ii) isolating automation applications from having to contend with multiple types of access protocols and the security requirements of each access protocol; (iii) employ a collect-once strategy that consolidates requests from multiple applications and minimizes the number of times network device(s) 104 are accessed for the same information; (iv) distribute collected data to external applications (e.g., such as a non-Crosswork application, via a customer owned Kafka bus and/or gRPC server) of destination device(s) 116; (v) offload work from management stations within a network to satellite computing VMs; and/or (vi) enabling geo-distribution of satellite VMs closer to networking device(s).

As illustrated, the controller(s) 102 may comprise memory 108, a congestion detection module 110, and a congestion avoidance module 112. As noted above and illustrated in FIG. 1, the memory may include a buffer comprising one or more designated memory location(s) 114. As noted above, the controller 102A may write first data destined for a first destination device 116A to a first designated memory location 114 (e.g., such as "1"). The controller 102A may write second data destined for a second destination device (e.g., 116B) to a second designated memory location (e.g., "3"). In some examples, each designated memory location 114 comprise a plurality of memory locations. As noted above, the congestion detection module 110 may detect congestion on the detection drains. For instance, the congestion detection module 110 may determine when the memory 108 of the controller 102 is full by more than a threshold amount (e.g., 40%, 70%, 80%, or any suitable threshold amount). As described in greater detail below with regard to FIG. 2, the congestion detection module 110 determines there is congestion according to two modes: (i) a slow mode, and (ii) a fast mode. When the congestion detection module 110 determines that the threshold amount has been met or exceeded, the congestion avoidance module 112 may be notified to implement one or more congestion avoidance mechanisms.

As noted above, the congestion detection module 110 may declare and/or determine there is congestion according to one or more modes. For instance, as illustrated the congestion detection module 110 comprises a fast mode 118 and a slow mode 120. As noted above, the congestion detection module 110 may determine there is congestion in a fast mode 118. In this example, the congestion detection module may determine and/or declare congestion where the drain rate (e.g., how fast the destination device reads data from the memory location(s) of the controller 102, which may be based on throughput of the destination device) of all destination devices are determined to be slow.

The congestion detection module 110 may determine there is congestion in a slow mode 120. In this example, the congestion detection module 110 may determine there is congestion if more than a threshold amount of a memory buffer is full (e.g., such that there is dnot a sufficient cushion between a write index of the buffer and any of the read index(es) of the buffer.

As described above, the congestion avoidance module 112 may identify a congestion avoidance mechanism to enact. For instance, where the controller 102 comprises a polling collector, such that the controller 102 controls the cadence at which network device(s) 104 are polled for data. In this example, when the congestion avoidance module 110 declares congestion, the congestion avoidance module 112 may determine to adjust a cadence at which the controller 102 receives data from the network device(s) 104. For instance, where the controller 102 polls the network device(s) 104 at a cadence of 30 seconds or greater, the congestion avoidance module 112 may extend the polling cycle for a period of time (e.g., increase the cadence to be 35 seconds, 40 seconds, or any other suitable time period). In some examples, such as where the controller 102 polls the network devices 104 at a cadence of less than 30 seconds, the congestion avoidance module 112 may determine to skip a polling cycle completely.

In other examples, the controller 102 may comprise a streaming collector, such that the controller 102 does not control when the network device(s) 104 send data to the controller 102. In this example, when the congestion avoidance module 110 declares congestion, the congestion avoidance module 112 may cause a throughput for the collector to be slowed down and/or temporarily suspended. For instance, the controller 102 may host a TCP endpoint that receives streaming data from the network device(s) 104. In this example, the congestion avoidance module 112 may slow down the TCP throughput and/or temporarily suspends the TCP receive calls. As a result, the controller 102 backpressures the network device(s) 104. For instance, by temporarily suspending the TCP receive calls, the kernel buffers are backpressured, which results in the TCP window shrinking. Accordingly, all network device(s) 104 that are sending data to the TCP endpoint hosted by the controller 102 will automatically slow down their rate of transmission. In this example, once the congestion detection module 110 determines that the buffer is less than a threshold amount full (e.g., such as 30%, 40%, or any other suitable threshold), the congestion avoidance module 112 is notified and the congestion avoidance module 112 may take the TCP receive call out of suspension, which lets the TCP window grow once again (e.g., increase streaming traffic again).

As illustrated, the controller(s) 102 communicate with network device(s) 104 via network(s) 106. The network device(s) 104 may comprise any computing device (e.g., router, switch, etc.) within a network. In some examples, the network device(s) 104 generate operation data, such as telemetry data. As illustrated, the controller(s) 102 may receive data (e.g., operational data, telemetry data, or any other type of data) from one or more of the network device(s) via a network 106.

The network(s) 106 may include one or more networks implemented by any viable communication technology, such as wired and/or wireless modalities and/or technologies. The network(s) 106 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 106 may include devices, virtual resources, or other nodes that relay packets from one network segment to another by nodes in the computer network. The network(s) 106 may include multiple devices that utilize the network layer (and/or session layer, transport layer, etc.) in the OSI model for packet forwarding, and/or other layers.

As illustrated, the system includes destination device(s) 116, which may communicate with the controller(s) 120 via the network(s) 106. In some examples, the destination device(s) 116 may receive and/or retrieve data 118 (e.g., telemetry data, operational data, processed data, or any other type of data) from the controller(s) 102. In some examples, destination device(s) 116 comprise computing device(s), such as user device(s) (e.g., computers, mobile devices, cameras, etc.), server(s) (e.g., Kafka brokers, servers, and/or gRPC servers), network devices, applications executing on a computing device, or any other type of computing device. As illustrated, a first destination device 116A may access and/or retrieve first data from a first designated memory location 114 (e.g., "1") within memory 108 of the controller 102A. A second destination device 116B may access, via the same network 106I) and/or a separate network 106E, second data written by the controller 102A to a second designated memory location 114 (e.g., "3") within the memory 108 of the controller 102A. In some examples, the first destination device 116A may access and/or retrieve the first data 118A at a first rate and the second destination device 116B may access and/or retrieve the second data 118B at a second rate. In some examples, the first rate may be different from the second rate (e.g., such that the first rate is faster or slower than the second rate). In other examples, the first rate may be the same as the second rate.

At "1", the controller 102 may receive data from one or more network device(s) 104. For instance, the controller 102 may receive data from multiple network device(s) 104 via a network 106. As noted above, the data may comprise telemetry data, operational data, or any other type of data.

At "2", the controller 102 may identify and/or determine a first designated memory location 114 from which a first destination device 116A reads data. For instance, the first designated memory location 114 may correspond to a portion of a buffer in the memory 108 of the controller 102.

At "3", the controller 102 may identify and/or determine a second designated memory location 114 from which a second destination device 116B reads data. For instance, the second designated memory location 114 may correspond to a portion of a buffer in the memory 108 of the controller 102.

At "4", the controller 102 may write data to the first designated memory location 114 and the second designated memory location 114 and increment a write index. For instance, the controller 102 may process the data and write one or more portions of the data to one or more designated memory locations 114.

At "5", the controller 102 may send one or more indication(s) to the first destination device 116A and the second destination device 116B that there is data to be consumed. For instance, the indication(s) may be included as part of one or more message(s) and may be included as part of a process that enables the destination device(s) 116 to read from the designated memory locations 114. In some examples, the first destination device 116A and the second destination device 116B may read a portion of the data from the same designated memory location 114. Additionally or alternatively, the first destination device and the second destination device may read data from different designated memory locations 114.

At "6", the controller 102 may determine that at least one of the first destination device 116A and/or the second destination device 116B retrieved data from a designated memory location 114.

At "7", the controller 102 may decrement and/or lower the write index. For instance, the controller 102 may decrement the write index in response to the destination device 116 dispatching the data to a send buffer (e.g., a Kafka and/or gRPC buffer). The controller may determine that data has been read from a designated memory location 114 based on a read index equaling a write index, indicating that the buffer and/or memory location 114 is empty.

Figure 2:
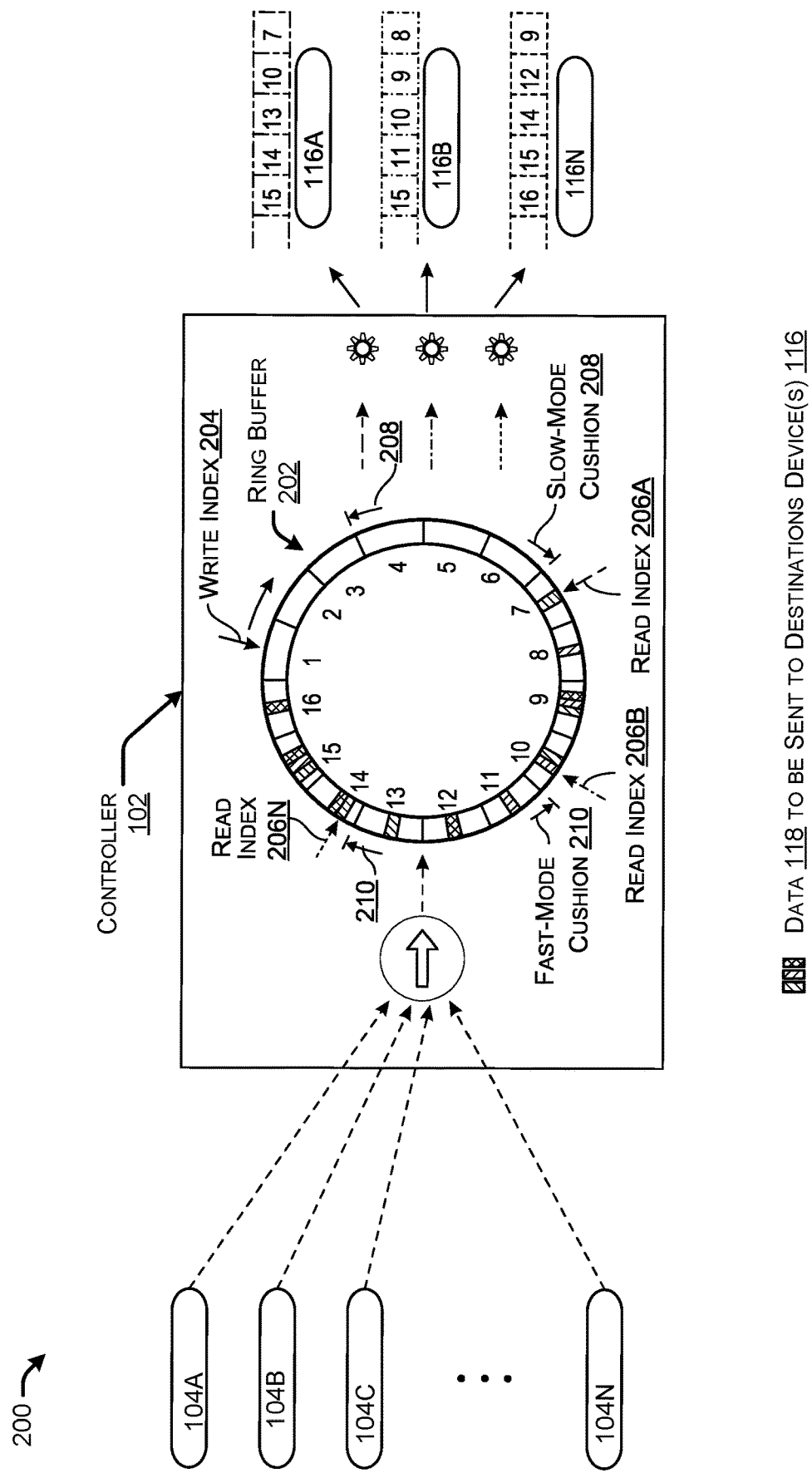
FIG. 2 illustrates a flow diagram of an example memory of the controller described in FIG. 1.

FIG. 2 illustrates a flow diagram 200 of example input(s) and output(s) of an example ring buffer 202 in the memory 108 of the controller 102 of FIG. 1. As illustrated, the ring buffer 202 may comprises memory locations (illustrated as positions 1-16), as well as a write index (e.g., also referred to as a write pointer) 204, and one or more read indexes (206A, 206B, 206N) (also referred to as read pointer(s) 206A, 206B, 206N). In some examples, the number of read pointer(s) 206 correspond to the number of destination device(s) 116. In this example, since there are three destination devices 116, there are three read pointer(s) 206 illustrated and each read pointer is associated with a destination device. In some examples, the memory locations may correspond to one or more designated memory locations 114 described above. As illustrated the controller 102 may receive data from one or more network device(s) 104 (illustrated as 104A, 104B, 104C, 104N). As noted above, the data may comprise telemetry data, operational data, or any other type of data. Initially, the write pointer 204 and the read pointer(s) 206 may start at position 1. As illustrated the controller 102 may write data destined for a particular destination device 116 to a particular location within the ring buffer 202. For instance, the controller 102 may write data to different positions within the ring buffer 202 and the read pointer(s) 206 may be incremented. As illustrated, read pointer 206A is located at position 7, read pointer 206B is located at position 10, and read pointer 206N is located at position 14, with the write index 204 located at position 1.

As noted above, before a write operation is initiated, the controller 102 may determine whether the ring buffer 202 is congested. If the ring buffer is not congested, then the controller 102 may send an indication to one or more of the destination devices 116 that data is ready to be consumed. In response, the destination devices 116 may access data from the ring buffer. For instance, as illustrated, data destined for destination device 116A is stored at positions 15, 14, 13, 10, and 7 in the ring buffer. The destination device 116A will increment the read pointer 206A across the positions of the ring buffer if there is no data at the position destined for the destination device 116A. If the position of the read pointer 206A does have data to be sent to the destination device 116A, the destination device 116A collects and dispatches the data to a send buffer (e.g., a Kafka buffer or gRPC buffer) and increments the read pointer 206A. In response to the send operation, the controller 102 receives an asynchronous callback. Once the asynchronous callback is received, the destination device 116A continues to check each position within the ring buffer for data. Once the read pointer 206A is equal to the write index (e.g., both are located at the same position within the ring buffer 202, the destination device 116A stops consuming data as the ring buffer is determined to be empty.

In some examples, the destination device 116A may be unreachable. In this example, the controller 102 may determine that the destination device 116A is unreachable and, in response, drop data destined for the destination device 116A.

As illustrated the ring buffer 202 may include a slow mode cushion 208. The slow mode cushion 208 may correspond to the slow mode 120 described above. For instance, before the write operation is performed, the controller 102 may check to see if there is sufficient room (e.g. size of the slow mode cushion 208) between the write pointer 204 and any of the read pointers 206. If the size of the slow mode cushion is below a particular threshold, the controller 102 may determine that the ring buffer 202 is congested. In the illustrated example, the slow mode cushion 208 has a size of 3 buffer positions. In this example, if the write index 204 increments to position 3, the controller 102 may determine that the ring buffer 202 is congested. As noted above the threshold may correspond to a portion of the ring buffer 202 that is full of data (e.g., 70%, 80%, or any other suitable threshold). As described above, once congestion is declared, the controller 102 may enact a congestion avoidance mechanism.

As illustrated, the ring buffer 202 may additionally or alternatively include a fast mode cushion 210. In some examples, the fast mode cushion 210 is associated with the fast mode 118 described above. In the fast mode 118, the drain rate of the fastest destination device 116 determines the overall pace at which the ring buffer 202 is drained (e.g., read from) and the controller 102 does not declare congestion unless all the destination device(s) 116 are slow. For instance, in the illustrated example, if the write index 204 increments to position 4 of the ring buffer 202, the controller 102 does not declare congestion immediately. Instead, the controller 102 may check the read pointer associated with the destination device 116 with the fastest drain rate (e.g., the destination device 116 whose read pointer is closest to the write index 204 in the reverse direction). If the controller 102 determines the size of the fast mode cushion 210 is greater than a threshold, the write operations continue. If the controller determines that the size of the fast mode cushion is below a threshold, the controller 102 may determine the ring buffer is congested and may trigger a congestion avoidance mechanism.

Figure 3A:
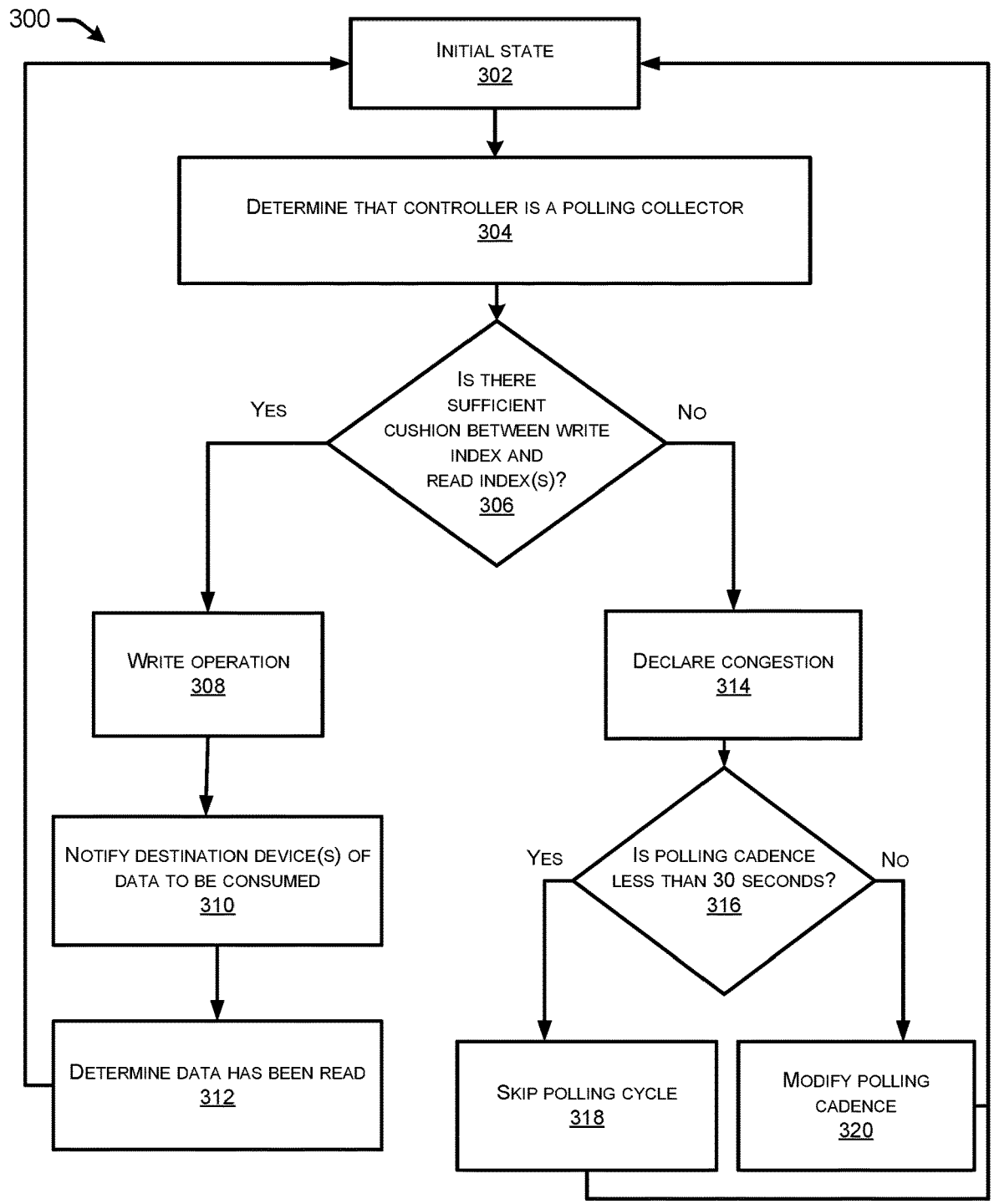
FIGS. 3A and 3B illustrate example state diagrams of the controller described in FIGS. 1 and 2.
Figure 3B:
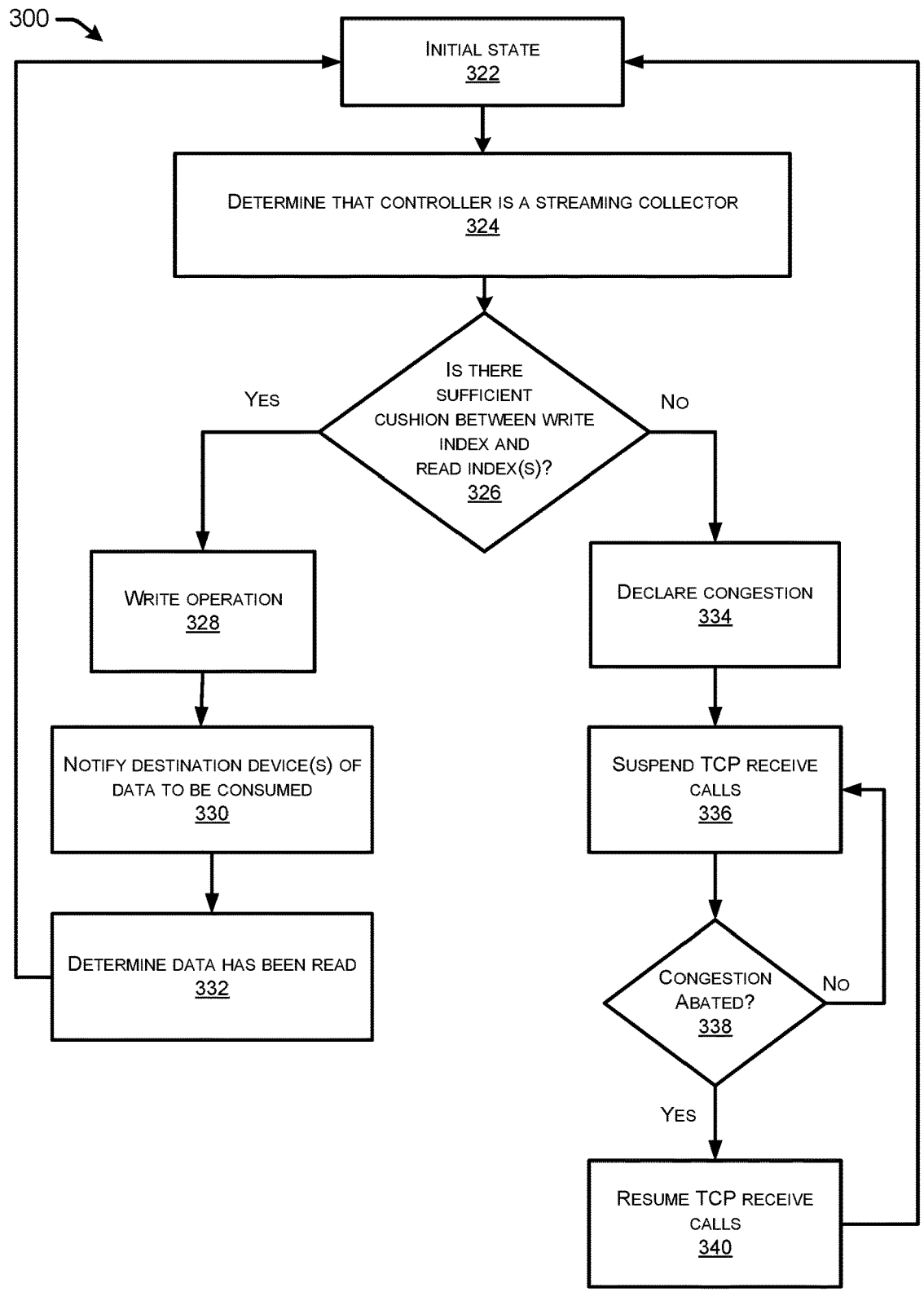

FIGS. 3A and 3B illustrate example state diagrams of the controller 102 illustrated FIGS. 1 and 2. As illustrated in FIG. 3A the controller 102 may start in an initial state 302. As described above, the controller 102 may comprise a buffer, such as the ring buffer 202. The ring buffer may include a write index and one or more read pointers. In the initial state 302, the write index and the read pointers all start at position 1 of the ring buffer 202.

At 304, the controller 102 may determine that it is a polling collector. As described above, a polling collector works on a request-response paradigm. Examples of polling collectors include SNMP, CLI, and Netconf.

At 306, the controller 102 may determine whether there is a sufficient cushion between a write index and one or more read indexes. For instance, the controller 102 may check to see if there is sufficient headroom (e.g. such as the number of positions in the buffer) between the write index and any of the read pointers. If the size of the slow mode cushion is below a particular threshold (e.g., less than a threshold number of positions in size), the controller 102 may determine that there is not a sufficient cushion. However, if the cushion is larger than or equal to the threshold number of positions in size, then the controller 102 may determine there is a sufficient cushion. As described above, the size of the cushion may correspond to a percentage of the buffer or memory of the controller 102 that is full. Accordingly, the controller 102 may determine that there is not a sufficient cushion in response to determining that the memory or buffer is greater than a threshold amount (e.g., 70%, 80%, or any other suitable threshold) full.

Where the controller 102 determines there is a sufficient cushion (e.g., step 306—Yes), the operations continue to 308. At 308, the controller may perform one or more write operations. For instance, as described above, the controller 102 may write data destined for each destination device to one or more designated memory location(s) and/or positions within the buffer and/or memory of the controller. As the controller 102 writes data to different positions within the memory and/or buffer and the write index may be incremented.

At 310, the controller 102 may notify the destination device(s) of data to be consumed. For instance, the controller 102 may send a signal to one or more of the destination device(s) indicating that there is data to be read from the designated memory location(s). In response and as described above, the one or more destination device(s) may access their associated read pointer and read data from the memory and/or buffer.

At 312, the controller 102 may determine that data has been read. For instance, the controller 102 may determine that data has been read based in part on a read pointer associated with a destination device being located at a same position within the memory and/or buffer as the write index.

Where the controller 102 determines there is not a sufficient cushion (e.g., step 306-No), the operations continue to 314. At 314, the controller 102 may declare congestion. As described above, the congestion detection module of the controller may determine and/or declare congestion and send an indication to the congestion avoidance module to enact a congestion avoidance mechanism.

At 316, the controller 102 determines whether the polling cadence is less than 30 seconds. In this example, the controller 102 is a polling collector, such that the controller 102 controls the cadence at which the collector 102 obtains data from the network devices.

Where the controller 102 determines the polling cadence is less than 30 seconds (e.g., step 316—Yes), the operations continue to 318. At 318, the controller 102 may determine to skip a polling cycle. For instance, the controller 102 may determine to not sent a polling request to the networking devices for at least one cycle.

Where the controller determines the polling cadence is greater than or equal to 30 seconds (e.g., step 316-No), the operations continue to 320. At 320, the controller 102 may modify the polling cycle. For instance, as described above, the controller 102 extend the polling cycle (e.g., such as increasing a polling cycle by 5 seconds, 10 seconds, or any suitable time period), For instance, where the original polling cycle is 30 seconds, the controller 102 may modify the polling cycle to be 35 seconds.

As illustrated in FIG. 3B, the controller 102 may start in an initial state 322. As described above, the controller 102 may comprise a buffer, such as the ring buffer 202 and/or any memory buffer. The ring buffer may include a write index and one or more read pointers. In the initial state 322, the write index and the read pointers all start at position 1 of the ring buffer 202.

At 324, the controller 102 may determine that it is a streaming collector. For instance, as described above, a streaming collector works on a register-listen paradigm. Examples of streaming collectors include gNMI, MDT, Syslog etc.

At 326, the controller 102 may determine whether there is a sufficient cushion between a write index and one or more read indexes. For instance, in this example, the cushion may correspond to an amount of headroom between the write index and the read pointer of the fastest destination device. For instance, the controller 102 may determine a drain rate (e.g. how fast the destination device reads data from the memory location(s) of the controller 102, which may be based on throughput of the destination device) associated with each of the destination devices associated with the read indexes. If the controller 102 determines the size of the cushion between the read pointer of the fastest consuming destination device and the write index is greater than a threshold (e.g., such as three positions, or any suitable threshold), the controller 102 may determine there is a sufficient cushion. If the controller determines that the size of the cushion between the read pointer of the fastest consuming destination device and the write index is below a threshold (e.g., less than three positions, or any other suitable threshold), the controller 102 may determine there is not a sufficient cushion. As described above, the size of the cushion may correspond to a percentage of the buffer or memory of the controller 102 that is full. Accordingly, the controller 102 may determine that there is not a sufficient cushion in response to determining that the memory or buffer is greater than a threshold amount (e.g., 70%, 80%, or any other suitable threshold) full.

Where the controller 102 determines there is a sufficient cushion (e.g., step 326—Yes), the operations continue to 328. At 328, the controller 102 may perform one or more write operations. For instance, as described above, the controller 102 may write data destined for each destination device to one or more designated memory location(s) and/or positions within the buffer and/or memory of the controller. As the controller 102 writes data to different positions within the memory and/or buffer and the write index may be incremented.

At 330, the controller 102 may notify destination device(s) of data to be consumed. For instance, the controller 102 may send a signal to one or more of the destination device(s) indicating that there is data to be read from the designated memory location(s). In response and as described above, the one or more destination device(s) may access their associated read pointer and read data from the memory and/or buffer.

At 332, the controller 102 may determine that data has been read. For instance, the controller 102 may determine that data has been read based in part on a read pointer associated with a destination device being located at a same position within the memory and/or buffer as the write index.

Where the controller 102 determines there is not a sufficient cushion (e.g., step 326-No), the operations continue to 334. At 334, the controller 102 may declare congestion. As described above, the congestion detection module of the controller may determine and/or declare congestion and send an indication to the congestion avoidance module to enact a congestion avoidance mechanism.

At 336, the controller 102 may suspend TCP receive calls. As described above, in some examples, such as where the controller 102 is a streaming collector, the controller 102 may host the TCP endpoint to receive streaming data. In this example, the controller 102 may cause the TCP throughput to be slowed down by temporarily suspending TCP receive calls and applying backpressure to the network devices (e.g., kernel buffers of the network devices).

At 338, the controller 102 may determine whether congestion has abated. For instance, the controller may determine that congestion has abated once the amount of data in the memory and/or buffer is below an abatement threshold. For instance, the abatement threshold may correspond to the memory and/or buffer being less than 40% full (or any other suitable threshold amount).

Where the controller 102 determines that congestion has abated (e.g., step 338—Yes), the operations continue to 340. At 340, the controller 102 may resume TCP receive calls. As described above, the controller 102 may take the TCP receive calls out of suspension, thereby allowing the TCP to grow and throughput of network devices and/or destination devices to increase. The operations may then return to 322 and the controller 102 may return to the initial state 322.

Where the controller 102 determines that congestion has not abated (e.g., step 338-No), the operations return to 336 and the controller 102 continues to suspend TCP receive calls.

Figure 4:
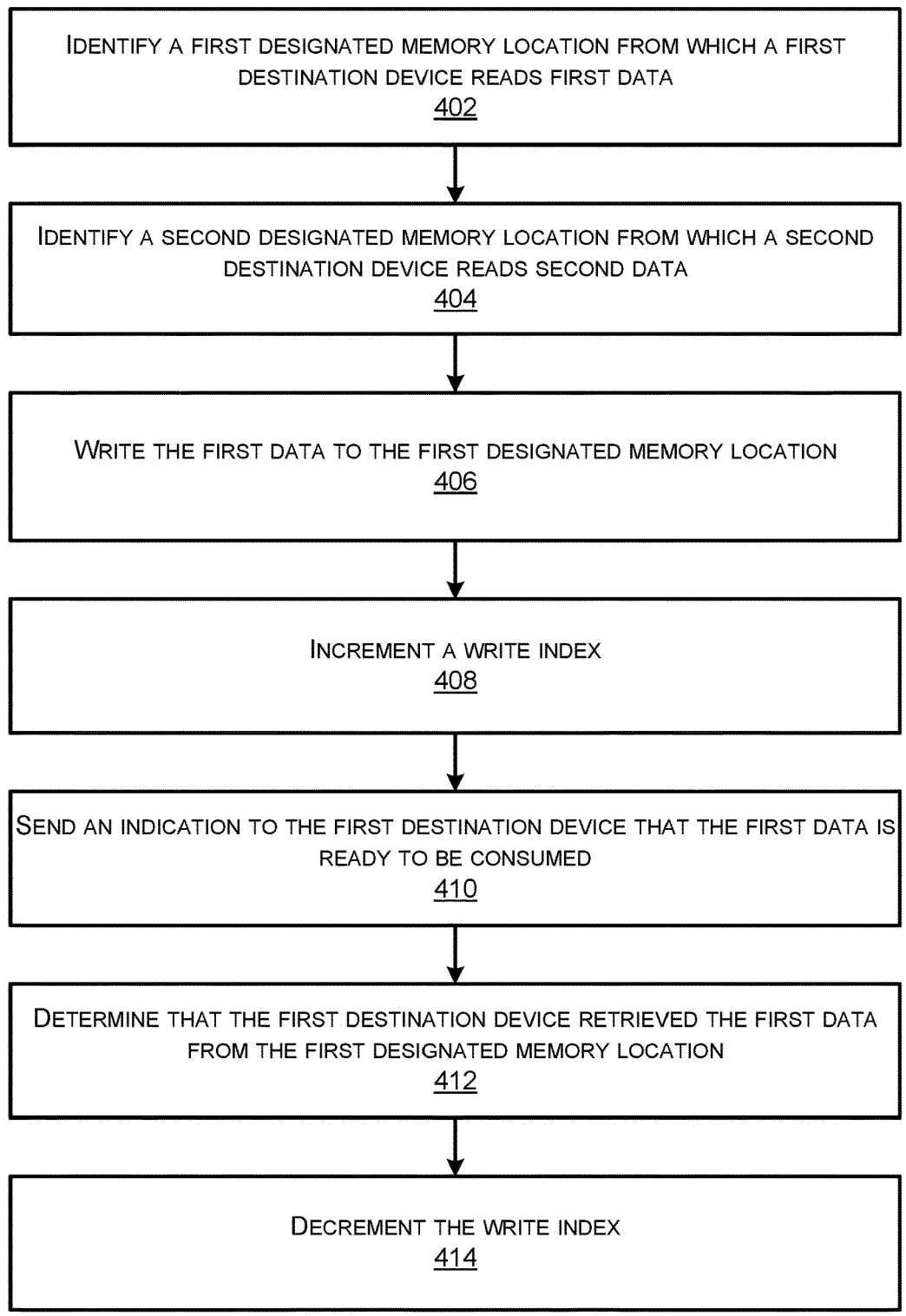
FIG. 4 illustrates a flow diagram of an example method for a controller to manage congestion in a network.

FIG. 4 illustrates a flow diagram of an example method 400 for a controller to manage congestion. In some instances, the steps of method 400 may be performed by a device (e.g., a controller 102, network device 104, destination device 116, etc.) that includes one or more processors and one or more non-transitory computer-readable media storing computer-executable instructions that, when executed by the one or more processors, cause the one or more processors to perform operations of method 400.

At 402, the controller 102 may the controller 102 may identify a first designated memory location from which a first destination device reads first data. For instance, the first designated memory location may correspond to a designated memory location 114 described above. The first destination device may comprise a destination device 116 described above. The first data may comprise one or more portion(s) of data received from one or more network device(s) 104. In some examples, the first designated memory location may comprise a plurality of memory locations.

At 404, the controller 102 may identify a second designated memory location from which a second destination device reads second data. For instance, the second designated memory location may correspond to a designated memory location 114 described above. The second destination device may comprise a destination device 116 described above. The second data may comprise one or more portion(s) of data received from one or more network device(s) 104. In some examples, the second designated memory location may comprise a plurality of memory locations. In some examples, one or more of the first designated memory locations and/or one or more of the second designated memory locations may comprise a same memory location (e.g., such as a same position within a buffer as described above).

At 404, the controller 102 may write the first data to the first designated memory location. For instance, as described above, the controller 102 may perform a write operation. As noted above, the controller 102 may write one or more portions of the first data to one or more first designated memory locations within a buffer. In some examples, the controller 102 may write the second data to the second designated memory location. As noted above, the controller 102 may write one or more portions of the second data to one or more second designated memory locations within a buffer. In some examples, the first data and/or the second data may comprise telemetry data.

At 408, the controller 102 may increment a write index. For instance, as described above, the controller 102 may increment a write index 204 to a new position associated with a new designated memory location within a memory buffer.

At 410, the controller 102 may send an indication to the first destination device that the first data is ready to be consumed. As described above, in response the first destination device may access the first designated memory location and/or a read pointer associated with the first destination device and perform read operation(s).

At 412, the controller 102 may determine that the first destination device retrieved the first data from the first designated memory location.

At 414, the controller 102 may decrement the write index. For instance, as described above, the controller 102 may decrement a write index 204 to a position associated with a designated memory location within a memory buffer (e.g., such as position 1 in the ring buffer 202 described above).

In some examples, and as described above, the controller may determine that more than a threshold number of the plurality of first memory locations are populated with the first data that has not been retrieved and, in response, reduce a rate at which the controller obtains additional data from a network device. For instance, the controller 102 may increase the time of the polling cadence (e.g., from 30 seconds to 35 seconds) and/or skip a polling period (e.g., such as when the polling cadence is less than 30 seconds) as described above. In some examples, such as when data packets are dropped or lost, the controller 102 may track lost data packets and send to a computing device, a message including an indication of reducing the rate at which the controller obtains the additional data and whether any data loss occurred.

In some examples, and as described above, the controller 102 may determine that the first destination device is retrieving the first data at a first pace and the first pace is faster than a second pace that the second destination device is retrieving the second data. In this example, such as where the controller 102 is a polling collector, the controller may write additional data to the first designated memory location and the second designated memory location based at least in part on the first pace. In some examples, such as where the controller is a streaming collector, the controller 102 may determine that the first destination device is experiencing packet loss and apply backpressure to at least the first destination device and the second destination device.

Figure 5:
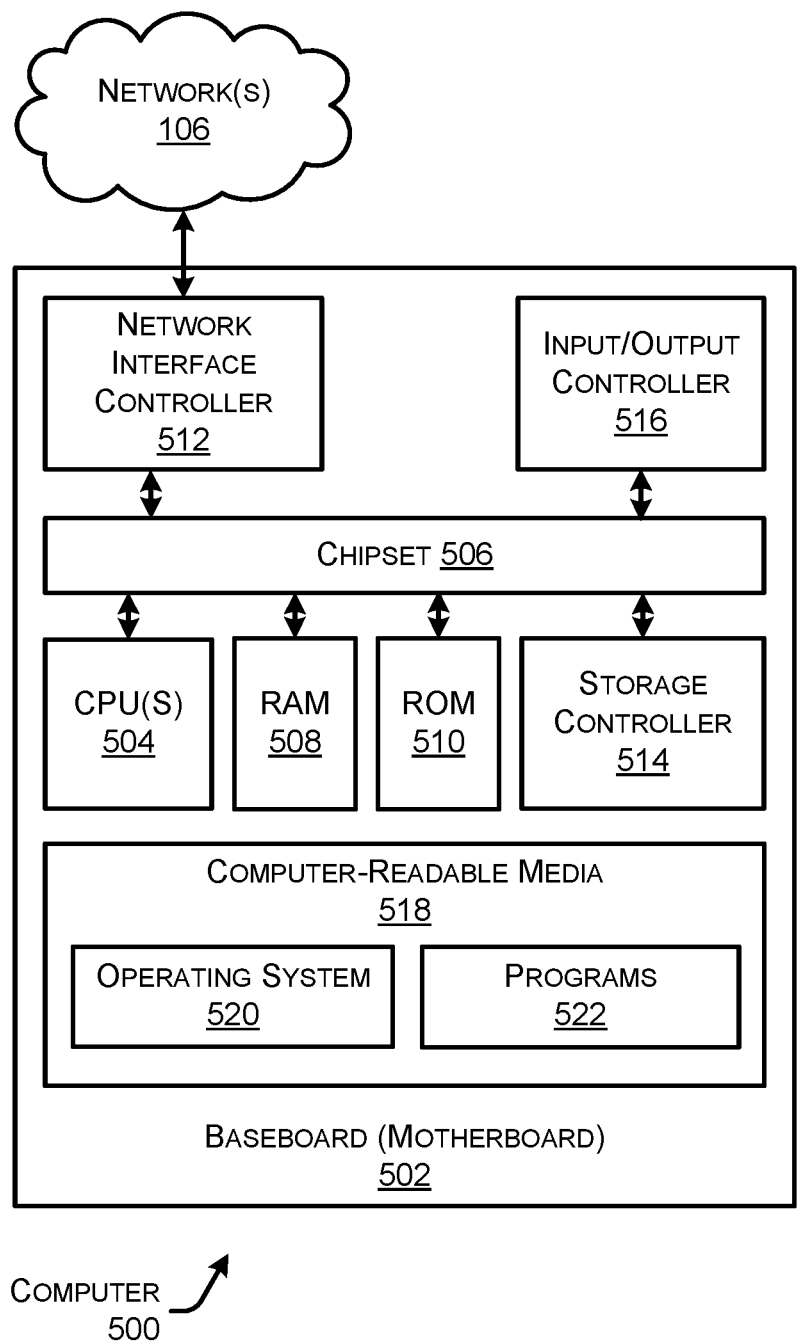
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a controller 102, a network device 104, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 402. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 106. The chipset 506 can include functionality for providing network connectivity through a NIC 512, such as a gigabit Ethernet adapter. The NIC 512 is capable of connecting the computer 500 to other computing devices over the network 106. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI("SAS")interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the controller 102, the network device 104, and/or any components included therein, may be supported by one or more devices similar to computer 500. Stated otherwise, some or all of the operations performed by the controller 102, the network device 104, and or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DV) ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a controller 102, a network device 104, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the controller 102, the network device 104, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™ and so forth.

The programs 522 may comprise any type of programs or processes to perform the techniques described in this disclosure for controlling congestion within a network. For instance, the programs 522 may cause the computer 500 to perform techniques for managing congestion within a network, including: identifying a first designated memory location from which a first destination device reads first data; identifying a second designated memory location from which a second destination device reads second data; writing the first data to the first designated memory location; incrementing, based at least in part on writing the first data, a write index; sending a first indication to the first destination device that the first data is ready to be consumed; determining that the first destination device retrieved the first data from the first designated memory location; and decrementing, based at least in part on the determining, the write index. In this way, a computer can optimally manage controller resources and reduce and/or minimize packet loss.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a controller within a network, the method comprising:
   identifying, from a memory associated with the controller, a first designated memory location from which a first destination device reads first data;
   identifying, from the memory, a second designated memory location from which a second destination device reads second data;
   maintaining a write index that indicates an amount of data that has been written to the first designated memory location, the write index being incremented each instance of data being written to the first designated memory location;
   writing the first data to the first designated memory location;
   incrementing, based at least in part on writing the first data, the write index;
   sending a first indication to the first destination device that the first data is ready to be consumed;
   determining that the first destination device retrieved the first data from the first designated memory location;
   incrementing, based at least in part on the first destination device retrieving the first data from the first designated memory location, a read index;
   comparing the write index and the read index to determine whether the memory is congested; and
   in response to determining that the memory is congested, reducing a rate at which data is collected by the controller and stored in the memory from which destination devices to read; or
   in response to determining that the memory is not congested, continuing to collect data at the rate by the controller.

2. The method of claim 1, wherein the first data and the second data comprise telemetry data.

3. The method of claim 1, wherein the first designated memory location comprises a plurality of memory locations from which the first destination device obtains the first data.

4. The method of claim 3, further comprising:
   determining that more than a threshold number of the plurality of first memory locations are populated with the first data that has not been retrieved; and
   based at least in part on the determining, reducing a rate at which the controller obtains additional data from a network device.

5. The method of claim 4, further comprising:
   sending to a computing device, a message including an indication of reducing the rate at which the controller obtains the additional data and whether any data loss occurred.

6. The method of claim 1, further comprising:
   determining that the first destination device is retrieving the first data at a first pace;
   determining that the first pace is faster than a second pace that the second destination device is retrieving the second data; and
   writing additional data to the first designated memory location and the second designated memory location based at least in part on the first pace.

7. The method of claim 6, further comprising:
   determining that the first destination device is experiencing packet loss; and
   applying backpressure to at least the first destination device and the second destination device.

8. The method of claim 1, wherein:
   the read index is a first read index associated with the first destination device retrieving the first data from the first designated memory location;
   further comprising:
      comparing a second read index with the write index, the second read index being associated with the second destination device retrieving the second data from the second designated memory location;
      determining that the comparison between the first read index and the write index indicates that the memory is not congested;
      determining that the comparison between the second read index and the write index indicates that the memory is congested; and
      reducing the rate at which data is collected by the controller and stored in the memory based at least in part on the comparison between the second read index and the write index indicating that the memory is congested.

9. A system comprising:
   one or more processors; and
   one or more non-transitory computer-readable media storing computer-executable instructions that, when executed by the one or more processors, cause the one or more processors to perform operations comprising:
      identifying, by a controller, a first designated memory location from which a first destination device reads first data;
      identifying, by the controller, a second designated memory location from which a second destination device reads second data;
      maintaining a write index that indicates an amount of data that has been written to the first designated memory location, the write index being incremented each instance of data being written to the first designated memory location;
      writing, by the controller, the first data to the first designated memory location;
      incrementing, by the controller and based at least in part on writing the first data, the write index;
      sending, by the controller, a first indication to the first destination device that the first data is ready to be consumed;

determining, by the controller, that the first destination device retrieved the first data from the first designated memory location;

incrementing, by the controller and based at least in part on the first destination device retrieving the first data from the first designated memory location, a read index;

comparing the write index and the read index to determine whether the memory is congested; and in response to determining that the memory is congested, reducing a rate at which data is collected by the controller and stored in the memory from which destination devices to read; or in response to determining that the memory is not congested, continuing to collect data at the rate by the controller.

10. The system of claim 9, wherein the first data and the second data comprise telemetry data.

11. The system of claim 9, wherein the first designated memory location comprises a plurality of memory locations from which the first destination device obtains the first data.

12. The system of claim 11, the operations further comprising:

determining that more than a threshold number of the plurality of first memory locations are populated with the first data that has not been retrieved; and based at least in part on the determining, reducing a rate at which the controller obtains additional data from a network device.

13. The system of claim 12, the operations further comprising:

sending to a computing device, a message including an indication of reducing the rate at which the controller obtains the additional data and whether any data loss occurred.

14. The system of claim 9, the operations further comprising:

determining that the first destination device is retrieving the first data at a first pace;

determining that the first pace is faster than a second pace that the second destination device is retrieving the second data; and writing additional data to the first designated memory location and the second designated memory location based at least in part on the first pace.

15. The system of claim 14, the operations further comprising:

determining that the first destination device is experiencing packet loss; and applying backpressure to at least the first destination device and the second destination device.

16. One or more non-transitory computer-readable media storing computer-readable instructions that, when executed by one or more processors, cause the one or more processors to perform operations comprising:

identifying a first designated memory location from which a first destination device reads first data;

identifying a second designated memory location from which a second destination device reads second data;

maintaining a write index that indicates an amount of data that has been written to the first designated memory location, the write index being incremented each instance of data being written to the first designated memory location;

writing the first data to the first designated memory location;

incrementing, based at least in part on writing the first data, the write index;

sending a first indication to the first destination device that the first data is ready to be consumed;

determining that the first destination device retrieved the first data from the first designated memory location;

incrementing, based at least in part on the first destination device retrieving the first data from the first designated memory location a read index;

comparing the write index and the read index to determine whether the memory is congested; and in response to determining that the memory is congested, reducing a rate at which data is collected and stored in the memory from which destination devices to read; or in response to determining that the memory is not congested, continuing to collect data at the rate by the controller.

17. The one or more non-transitory computer-readable media of claim 16, wherein the first data and the second data comprise telemetry data.

18. The one or more non-transitory computer-readable media of claim 16, wherein the first designated memory location comprises a plurality of memory locations from which the first destination device obtains the first data.

19. The one or more non-transitory computer-readable media of claim 18, the operations further comprising:

determining that more than a threshold number of the plurality of first memory locations are populated with the first data that has not been retrieved; and based at least in part on the determining, reducing a rate at which a controller obtains additional data from a network device.

20. The one or more non-transitory computer-readable media of claim 16, the operations further comprising:

determining that the first destination device is retrieving the first data at a first pace;

determining that the first pace is faster than a second pace that the second destination device is retrieving the second data; and writing additional data to the first designated memory location and the second designated memory location based at least in part on the first pace.

21. The one or more non-transitory computer-readable media of claim 20, the operations further comprising:

determining that the first destination device is experiencing packet loss; and applying backpressure to at least the first destination device and the second destination device.

* * * * *